United States Patent
Buley et al.

(10) Patent No.: US 9,321,401 B2
(45) Date of Patent: Apr. 26, 2016

(54) STOP-ARM WITH CAMERA SYSTEM

(71) Applicant: WOODSTOCK SAFETY MIRROR COMPANY, INC., Shokan, NY (US)

(72) Inventors: Gloria M. Buley, New York, NY (US); Wesley A. Buley, New York, NY (US); Wesley S. Buley, New York, NY (US); Travis C. Buley, New York, NY (US)

(73) Assignee: WOODSTOCK TRANSPORTATION COMPONENTS, INC., Scarsdale, NY (US)

(*) Notice: Subject to any disclaimer, the term of this patent is extended or adjusted under 35 U.S.C. 154(b) by 196 days.

(21) Appl. No.: 14/060,275

(22) Filed: Oct. 22, 2013

(65) Prior Publication Data
US 2014/0098231 A1  Apr. 10, 2014

Related U.S. Application Data (63) Continuation-in-part of application No. 12/699,517, filed on Feb. 3, 2010, now Pat. No. 8,562,156, which is a continuation-in-part of application No. 12/169,416, filed on Jul. 8, 2008, now Pat. No. 8,534,850, which is a continuation of application No. 11/690,620, filed on Mar. 23, 2007, now Pat. No. 7,407,299, which is a continuation of application No. 10/702,347, filed on Nov. 6, 2003, now Pat. No. 7,210,802.

(60) Provisional application No. 61/839,226, filed on Jun. 25, 2013.

(51) Int. Cl.
*G02B 7/18* (2006.01)
*B60R 1/00* (2006.01)
*B60R 1/08* (2006.01)

(52) U.S. Cl.
CPC . *B60R 1/00* (2013.01); *B60R 1/002* (2013.01); *B60R 1/082* (2013.01)

(58) Field of Classification Search
CPC .............. B60R 2021/0067; B60R 2013/0287; B60R 2022/4808; B60R 2022/4866; B60R 2300/8066; B60Q 1/2692; B60Y 2200/143; F16F 7/12
USPC ........................................................ 359/841
See application file for complete search history.

(56) References Cited

U.S. PATENT DOCUMENTS

| | | | | |
|---|---|---|---|---|
| 5,281,948 A * | 1/1994 | Estrada | | 340/433 |
| 5,793,420 A * | 8/1998 | Schmidt | | 348/148 |
| 6,693,519 B2 * | 2/2004 | Keirstead | | 340/435 |
| 7,059,663 B1 * | 6/2006 | Buley | | B62D 35/00 116/52 |
| 2008/0122597 A1 * | 5/2008 | Englander | | 340/433 |

* cited by examiner

*Primary Examiner* — Jade R Chwasz
(74) *Attorney, Agent, or Firm* — McAndrews, Held & Malloy, Ltd.

(57) ABSTRACT

A stop-arm with camera system for a vehicle is provided. The stop-arm with camera system may include a shield, a stop-arm, and a camera assembly. The stop-arm includes a first side and a second side. The stop-arm may be deployable between a first position where the first side of the stop-arm is disposed at least partially inside the shield, and a second position where the stop-arm is substantially perpendicular to the shield. The camera assembly is coupled to the first side of the stop-arm. The stop-arm with camera system may be mounted on a rear passenger side of the vehicle, which may be a bus. The camera assembly may provide a view including an area that is under the vehicle and between a rear wheel of the vehicle and a front wheel of the vehicle when the stop-arm is in the second position.

22 Claims, 13 Drawing Sheets

STOP-ARM WITH CAMERA SYSTEM

CROSS-REFERENCE TO RELATED APPLICATIONS/INCORPORATION BY REFERENCE

The present application is a continuation-in-part of U.S. patent application Ser. No. 12/699,517, filed Feb. 3, 2010, which is a continuation-in part of U.S. patent application Ser. No. 12/169,416, now U.S. Pat. No. 8,534,850, filed Jul. 8, 2008, which is a continuation of U.S. patent application Ser. No. 11/690,620, now U.S. Pat. No. 7,407,299, filed Mar. 23, 2007, which is a continuation of U.S. patent application Ser. No. 10/702,347, now U.S. Pat. No. 7,210,802, filed Nov. 6, 2003. The present application claims the benefit of U.S. Provisional Application Ser. No. 61/839,226, filed Jun. 25, 2013. The above-identified applications are hereby incorporated herein by reference in their entirety.

U.S. patent application Ser. No. 13/269,287, by Yinko, JR. et al., published Apr. 12, 2012 as U.S. Publication No. 2012/0085184, is incorporated by reference herein in its entirety.

U.S. patent application Ser. No. 13/663,217, by Buley et al., published May 9, 2013 as U.S. Publication No. 2013/0112835, is incorporated by reference herein in its entirety.

U.S. Pat. No. 7,059,663 issued to Buley et al. on Jun. 13, 2006, is incorporated by reference herein in its entirety.

U.S. Pat. No. 7,192,078 issued to Buley et al. on Mar. 20, 2007, is incorporated by reference herein in its entirety.

U.S. Pat. No. 7,407,300 issued to Buley on Aug. 5, 2008, is incorporated by reference herein in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to stop-arm systems. More specifically, the present invention provides a modified camera embedded in a stop-arm for increasing driver vision and clarity of blind spots around school buses or other vehicles. A shield protects the camera from debris and contaminants until the stop-arm is deployed. The stop-arm with camera system may be employed by school buses and other vehicles to reduce fatalities among school-aged children and to reduce the incidents of accidents involving children, adults, cars, and the like.

Between the years 2000 and 2011, school buses have been involved in an average of 26,000 accidents each year, according to the NASS-GES (National Automotive Sampling System-General Estimates System) and the National Highway Traffic Safety Administration. During this same period, an average of 19 school-age children have been killed in accidents labeled "By Own Bus." Over a 30 year period, the record is even worse: During that period, an average of one child in the U.S. has been killed by his or her own bus each school week (National Highway Traffic Safety Administration, 2000).

Children are at the greatest risk in what is known as the "Danger Zone," a ten foot area on each side of the bus. A child who has fallen under their bus, has unthinkingly crawled under the bus to retrieve a dropped item, or has been caught by an article of clothing under the right side of the bus cannot be seen by the driver of the bus.

One child was caught by the handrail of a bus on the drawstring of her coat, dragged 50 feet and then run over and killed. Another child was dragged 3-4 feet and lived, suffering a broken leg. Another child was caught by his mitten string, dragged, and run over and killed. A child who escaped unharmed had crawled under the bus to place a milk carton in front of the right rear tire, in order to watch the bus crush it. The driver counted one child short and went to look. (Congressional Record Vol. 141, No. 62, 1995).

In all these cases, the child in peril was invisible to the driver, despite the existence of six mirrors on most school buses. State laws typically require bus drives to be buckled, and the most dangerous area near the right rear tire cannot be seen by the bus driver from his or her seat.

In light of these tragedies, the National Safety Transportation Association, National Association for Pupil Transportation recommends the following lifesaving procedures: "Before moving your bus know where the children are who have just disembarked. Don't move until you're certain you know where they are. If you have lost track of a child, do not move the bus, shut off and secure the bus, take the key, get out, and check around and underneath the bus. Err on the side of caution."

Although these recommendations make sense, and have undoubtedly saved lives on many occasions, experienced bus drivers point out that leaving a bus may not be practical in some instances: With 60 children on a bus, leaving the bus invites the possibility that one of the unruly children will bully and hurt another child or even release the emergency brake. In addition, experienced bus drivers report that an outbreak of hitting and yelling in the back of the bus often requires the driver to look back in the bus to check on the present danger that someone is being hurt. Such a distraction often makes it difficult or impossible to keep accurate count of the children who have left the bus. Anyone who has ridden a school bus regularly will recall such distractions. Drivers report that a group of children sometimes becomes so uncontrollable that the drivers' only recourse is to radio the dispatcher to send for the police to remove the offenders.

An additional problem comes when other drivers pass illegally on the right of the bus. Surprising as it may seem, impatient drivers who pass on the right side of the bus also cause the deaths of school children. Even when children are not involved, a car pulling up on the right side of the bus may be unnoticed if it stops in the area not visible from the driver's seat. Seeing that the way appears clear for a right turn, the bus driver may turn into, and damage, the stopped vehicle.

Previously, Gloria Buley introduced a convex mirror system which gives a reverse image of the blind spots around the right side of school buses. However, in some instances, the view from the mirror can be distorted by the vibration of the school bus. Further, the image provided by the convex mirror system is reversed, which can cause confusion for some drivers. Although the mirror helps reveal the blind spots during the daylight, it offers little, if any, aid at night. Also, certain times of the day, like sunrise and sunset, a glare may occur in specific situations which can preclude a driver from using the mirror. Additionally, in some instances, the radius of curvature needed to view the blind spots may distort the image to the driver.

Existing cameras that may be attached a stop-arm do not provide increased vision and clarity with blind spots on the right side of school buses. Instead, existing cameras provide a limited field of view and merely capture license plates of illegally passing motorists on the left side of school buses, for example. Another problem with existing cameras is cleanliness. For example, current camera systems are often ineffective due to constant exposure to dirt, snow, road grime, and other debris.

Further limitations and disadvantages of conventional and traditional approaches will become apparent to one of skill in the art, through comparison of such systems with some aspects of the present invention as set forth in the remainder of the present application.

SUMMARY OF THE INVENTION

Certain embodiments of the present technology provide a stop-arm with camera system, substantially as shown in and/or described in connection with at least one of the figures.

These and other advantages, aspects and novel features of the present invention, as well as details of an illustrated embodiment thereof, will be more fully understood from the following description and drawings.

The foregoing summary, as well as the following detailed description of embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF PREFERRED EMBODIMENT(S)

Embodiments of the present technology provide a stop-arm system comprising a modified camera embedded in a stop-arm for increasing driver vision and clarity of blind spots around school buses or other vehicles. The stop-arm system comprises a shield that protects the camera from debris and contaminants until the stop-arm is deployed into an open position.

Aspects of the present invention provide a stop-arm with camera system 21 for a vehicle 1. The stop-arm with camera system 21 comprises a shield 22, a stop-arm 29, and a camera assembly 26. The stop-arm 29 comprises a first side and a second side. The stop-arm 29 is deployable between a first position where the first side of the stop-arm 29 is disposed at least partially inside the shield 22, and a second position where the stop-arm 29 is substantially perpendicular to the shield 22. The camera assembly 26 is coupled to the first side of the stop-arm 29.

Various embodiments provide a deployable stop sign with camera system 600. The deployable stop sign with camera system 600 comprises a sign 602 and a camera assembly 702. The sign 602 comprises a first side facing a front of the vehicle 1 and a second side facing a rear of the vehicle 1. The sign 602 is deployable between a first position where the sign 602 is disposed inside or behind the vehicle 1, and a second position where the sign 602 is extended beyond a side 3 of the vehicle 1 and is substantially perpendicular to the side 3 of the vehicle 1. The camera assembly 702 is coupled to the first side of the sign 602. The camera assembly 702 provides a view 100 of an area that is under the vehicle 1 and between a rear wheel 5 of the vehicle 1 and a front wheel of the vehicle 1 when the sign 602 is in the second position.

As utilized herein, the terms "exemplary" or "example" means serving as a non-limiting example, instance, or illustration. As utilized herein, the term "e.g." introduces a list of one or more non-limiting examples, instances, or illustrations.

Figure 1:
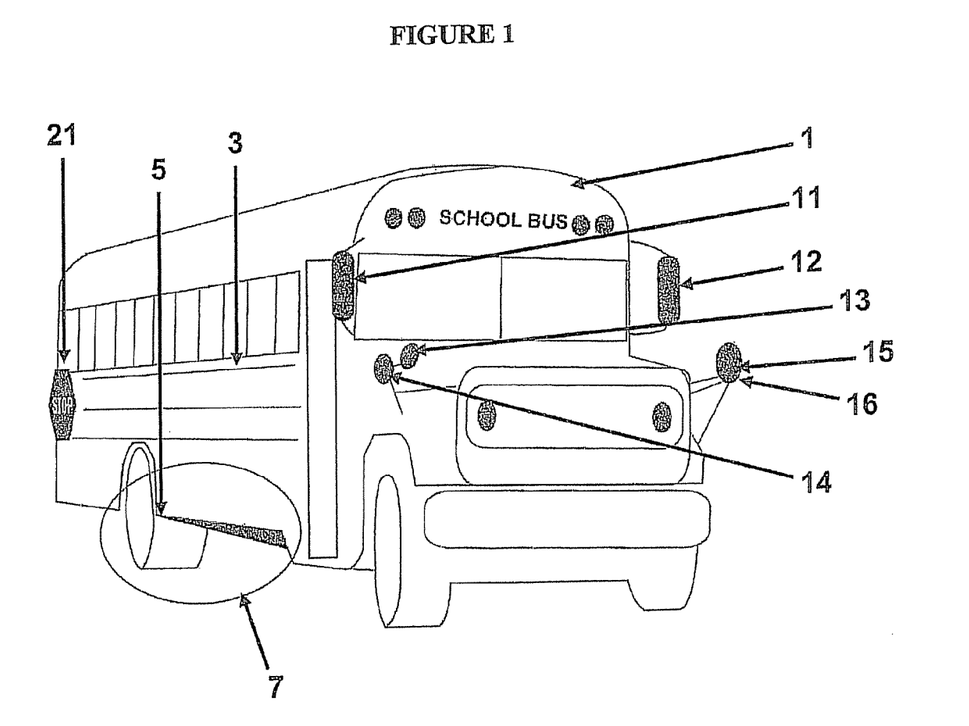
FIG. 1 depicts a front right perspective view of a bus with an exemplary stop-arm with camera system in a closed position used in accordance with embodiments of the present technology.

FIG. 1 depicts a front right perspective view of a bus 1 with an exemplary stop-arm with camera system 21 in a closed position used in accordance with embodiments of the present technology. Referring to FIG. 1, conventional school buses typically include round mirrors 13-16 and large rectangular mirrors 11-12 at the front sides of the bus 1 for viewing by a driver. Round mirrors 13 and 14 are intended to provide a view of the right front and right side of the bus, respectively. Round mirrors 15 and 16 are intended to provide a view of the left front and left side of the bus, respectively. Large rectangular mirrors 11 and 12 function as normal outside rear view mirrors, providing views of the following traffic on the right and left side of the bus, respectively, as well as additional view of the right 3 and left side of the bus 1 itself. Danger zone 7, as shown in FIG. 1, is not visible to the driver in any mirror. Various embodiments provide a stop-arm with camera system 21 mounted on the right (passenger side) 3 rear of the bus 1. The stop-arm with camera system 21 includes a camera assembly 26, as illustrated in FIGS. 6-7 and 13-14 and described in more detail below, to provide the driver with a view of danger zone 7.

Figure 2:
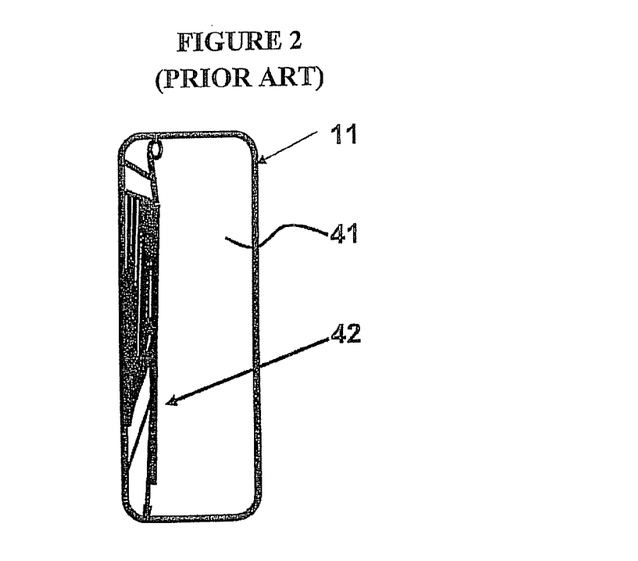
FIG. 2 depicts an exemplary view in a front right side large rectangular mirror as may be seen by a driver of a bus 1 as is known in the art.

FIG. 2 depicts an exemplary view 41 in a front right side large rectangular mirror 11 as may be seen by a driver of a bus 1 as is known in the art. Referring to FIG. 2, the right side rear 42 of the bus can be plainly seen, but the danger zone 7 is not visible.

Figure 3:
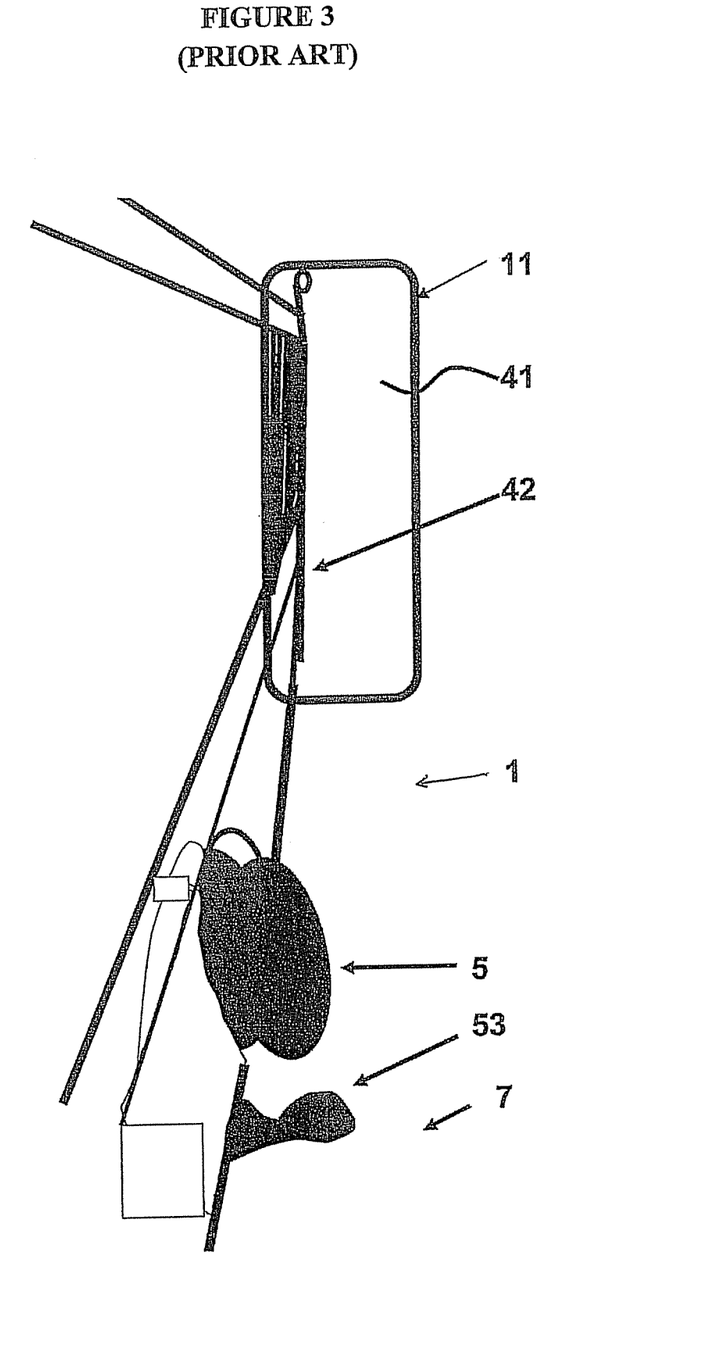
FIG. 3 depicts exemplary areas of a right side of a bus that cannot be seen by a driver through a view provided by a front right side large rectangular mirror as is known in the art.

FIG. 3 depicts exemplary areas of a right side of a bus 1 that cannot be seen by a driver through a view 41 provided by a front right side large rectangular mirror 11 as is known in the art. Referring to FIG. 3, the standard right rear view mirror 11 and its view 41 as seen from the perspective of the seated bus driver (not shown), along with the areas on the right side of the bus which are not in the bus driver's view, e.g., the danger zone 7. In particular, neither the right front wheel (not shown) nor the rear wheel 5 of the bus is visible in mirror 11. The presence of a child 53 who had crawled under the bus in front of the rear wheel 5 cannot be seen in mirror 11 or in any other present mirror.

Figure 4:
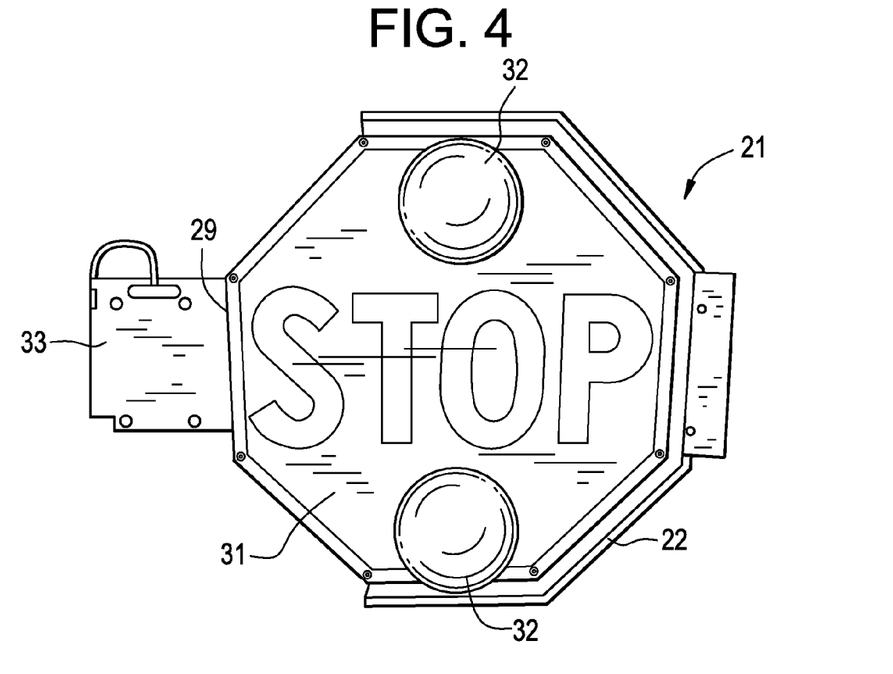
FIG. 4 depicts a front view of an exemplary stop-arm with camera system in a closed position used in accordance with embodiments of the present technology.
Figure 5:
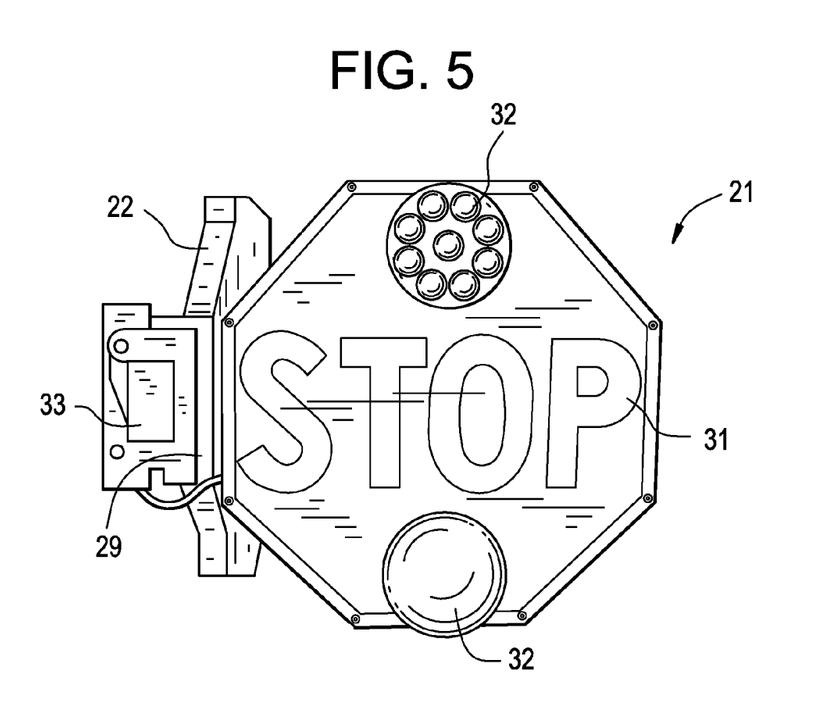
FIG. 5 depicts a side view of an exemplary stop-arm with camera system in an open position with activated lights used in accordance with embodiments of the present technology.

FIG. 4 depicts a front view of an exemplary stop-arm with camera system 21 in a closed position used in accordance with embodiments of the present technology. FIG. 5 depicts a side view of an exemplary stop-arm with camera system 21 in an open position with activated lights 32 used in accordance with embodiments of the present technology. Referring to FIGS. 4-5, various embodiments provide a stop-arm with camera system 21 comprising a shield 22, a stop-arm 29, and a motor 33. The stop-arm 29 may deter illegally passing traffic on the right side, for example, when the stop-arm with camera system 21 is activated such that a motor 33 rotates the stop-arm 29 from a closed position that is substantially parallel to a shield 22 mounted to a vehicle 1, to an open position that is substantially perpendicular to the shield 22 mounted to the vehicle 1. In various embodiments, the shield 22 protects a camera assembly 26, as illustrated in FIGS. 6-7 and 13-14, until it is deployed during bus stops. After passengers are unloaded and a driver is ready to continue with a route, the motor 33 rotates the stop-arm 29 such that the camera assembly 26 returns into its shield 22 and is protected from the dirt, elements, road grime, and other debris which render other school bus cameras ineffective.

Certain embodiments provide a built-in stop sign 31 on the back of the stop-arm 29 for helping deter motorists from illegally passing a stopped school bus on the right, thus minimizing fatalities and injuries caused by motorists hitting boarding or discharging passengers. When the bus is driving, standing, parked, or not in use, certain embodiments provide that the stop-arm with camera system 21 is in a closed position, as illustrated in FIG. 4, for example. The closed position allows the stop-arm with system 21 to remain pressed against the bus 1 and protects the camera assembly 26 from dirt, elements, road grime, and other debris. When the school bus stops and the driver turns on the master switch, or any suitable mechanism, to unload or load passengers, various embodiments provide that the camera assembly 26 turns on and the stop-arm 29 deploys perpendicular to the shield 22. In certain embodiments, lights 32 on the stop sign 31 may turn on and/or flash to help deter traffic from passing on the right when the stop-arm 29 is deployed to an open position, as illustrated in FIG. 5, for example.

Figure 6:
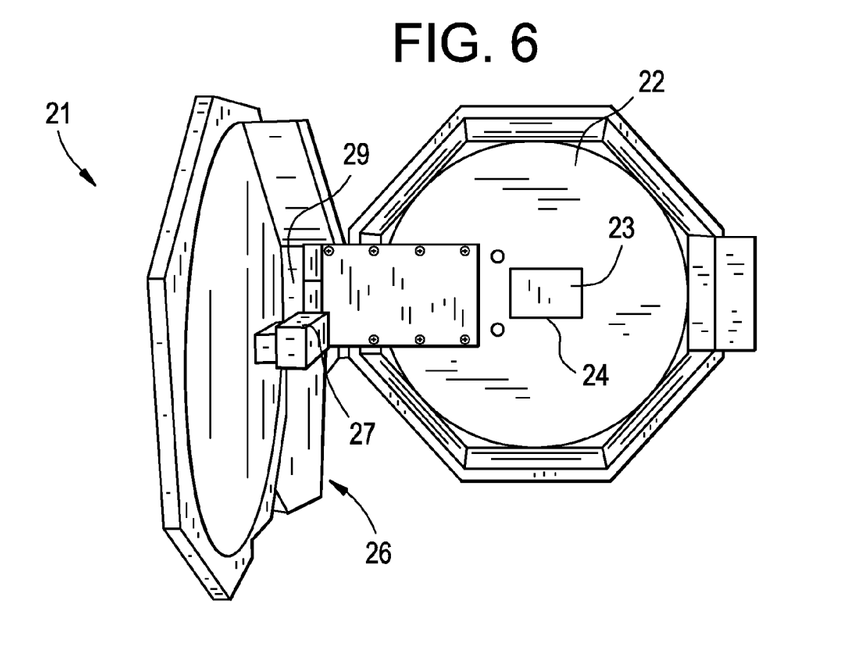
FIG. 6 depicts a front view of an exemplary stop-arm with camera system in an open position with a camera assembly coupled to a first side of a stop-arm and a shield comprising a camera recess holding a recessed camera shield box used in accordance with embodiments of the present technology.
Figure 7:
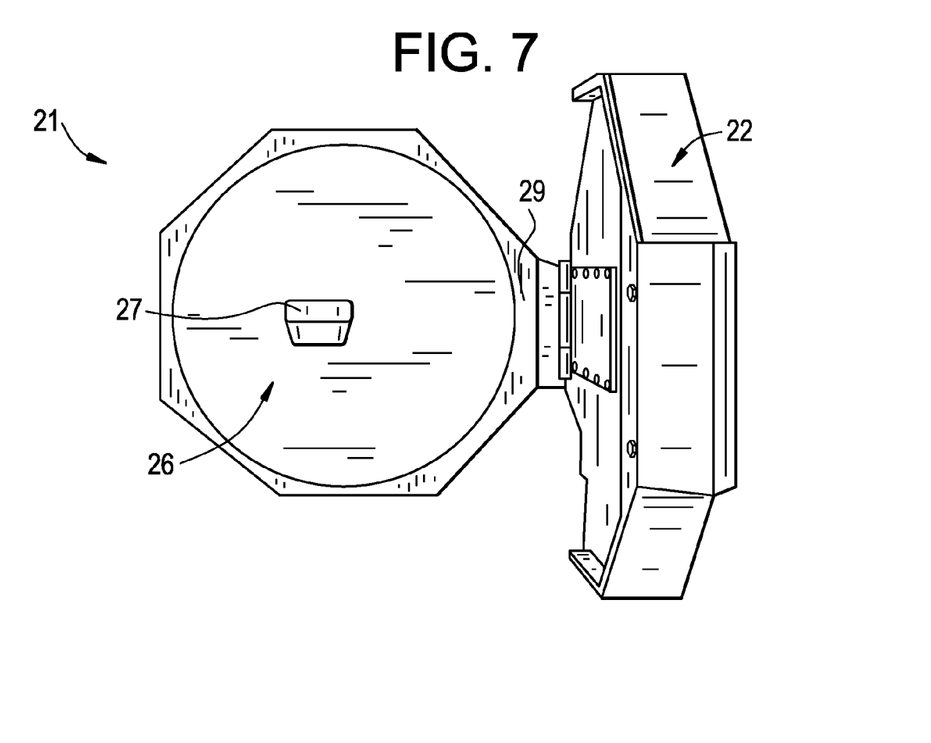
FIG. 7 depicts a side view of an exemplary stop-arm with camera system in an open position with a camera assembly coupled to a first side of a stop-arm used in accordance with embodiments of the present technology.

FIG. 6 depicts a front view of an exemplary stop-arm with camera system 21 in an open position used in accordance with embodiments of the present technology. FIG. 7 depicts a side view of an exemplary stop-arm with camera system 21 in an open position used in accordance with embodiments of the present technology. Referring to FIGS. 6-7, a stop-arm with camera system 21 comprises a shield 22 and a stop-arm 29. A first side of the stop-arm 29 may comprise a camera assembly 26, such as an optical lens. The shield 22 can comprise a camera recess 23 holding a recessed camera shield box 24. The stop-arm system with camera system 21 allows a driver of a vehicle 1 to see blind spots on the right side of the vehicle 1, for example, while also providing a stop-arm 29 to deter illegally passing traffic on the right side.

Figure 9:
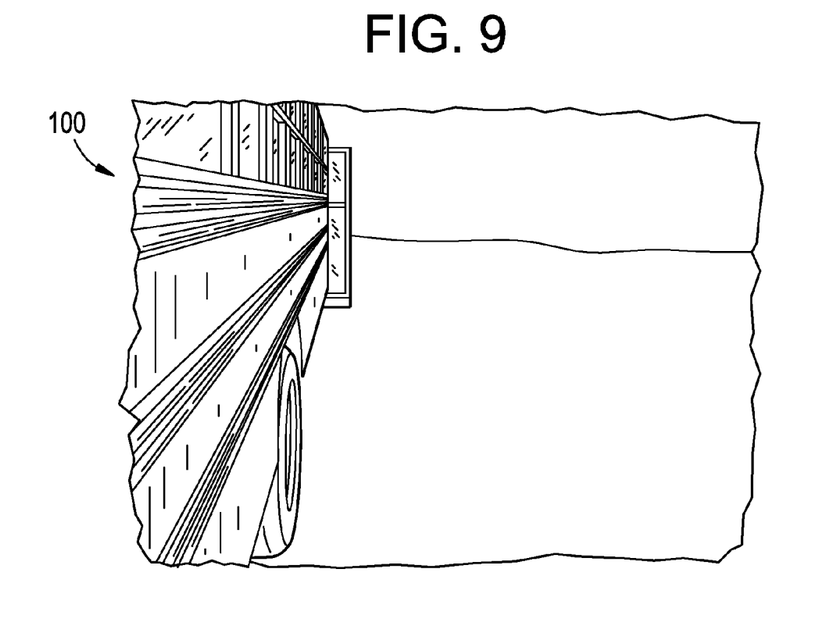
FIG. 9 depicts an exemplary view from a camera assembly of an exemplary stop-arm with camera system used in accordance with embodiments of the present technology.

In various embodiments, the camera assembly 26 is recessed into a stop sign 31 of the stop-arm 29, and points down a right side of a vehicle 1 to offer a view of the danger zone 7, as illustrated in FIG. 9, for example, when the stop-arm 29 is deployed in an open position. As illustrated in FIGS. 6-7, the camera assembly 26 can be mounted to a first side of the stop-arm 29. Various embodiments provide that the camera assembly 26 comprises lights and/or night vision to provide views of the danger zone 7 at night, which allows for increased safety for boarding and discharging passengers at night, especially when they are in blind spots and the danger zone 7. The camera assembly picture quality is unaffected by the vibration of the school bus, or any suitable vehicle to which the stop-arm with camera system 26 is attached. In certain embodiments, the camera assembly 26 comprises a visor 27 that minimizes sun glare during sunrise and sunset, for example. The camera assembly 26 provides a wide view for expansive coverage of school bus blind spots.

The stop-arm with camera system 21 comprises a shield 22 for protecting the camera assembly 26 when the stop-arm 29 is in a closed position. The shield 22 comprises a cavity 23 cut into the shield 22 to hold a camera shield box 24. The camera shield box 24 allows reception of the camera assembly 26 when the stop-arm 29 returns to the closed position, as illustrated in FIG. 4. For example, the stop-arm 29 moves the camera assembly 26 into the camera shield box 24 of the protective shield 22 when the bus 1 is driving down the road or parked so that the camera assembly 26 remains clean and protected. Protecting the camera assembly 26 when the camera assembly 26 is not in use maximizes the quality of pictures and precludes the driver from having to stop and clean the camera system during a rainy or snowy route. In other words, the shield 22 reduces the need for maintenance and cleaning because exposure to dirt, elements, road grime, and debris is minimized, for example.

Figure 8:
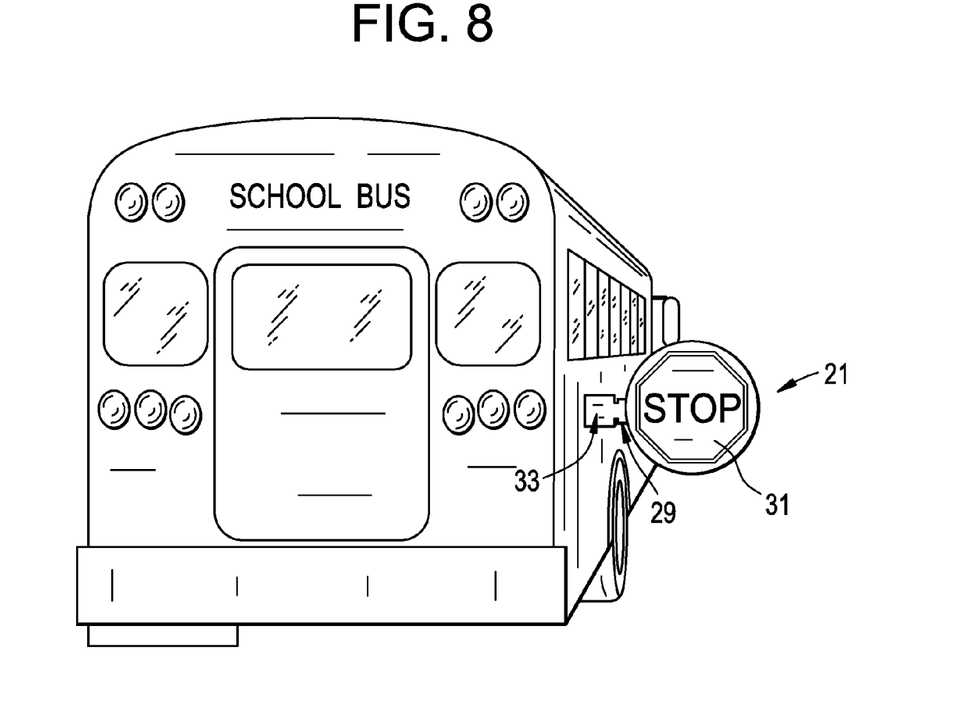
FIG. 8 depicts a rear right perspective view of a bus with an exemplary stop-arm with camera system in an open position used in accordance with embodiments of the present technology.

FIG. 8 depicts a rear right perspective view of a bus 1 with an exemplary stop-arm with camera system 21 in an open position used in accordance with embodiments of the present technology. Referring to FIG. 8, the stop-arm system 21 may comprise a rearward facing stop sign 31, which preferably is attached to the backside of stop-arm 29. The stop-arm system 21 is mounted with stop-arm 29 to motor 33 which may be operated by the driver to swing the stop-arm system 21 out at approximately right angles to the bus 1, thereby notifying other people located behind the bus that the driver has brought the bus to a stop and that children may be exiting. Stop sign 31 may also contain blinking red stop lights 32 as illustrated in FIGS. 4-5, for example. In various embodiments, the operation of the stop-arm system 21 by the driver can further activate a camera assembly 26, as illustrated in FIGS. 6-7 and 13-14, such that visibility of the right side wheels of the bus is provided to a driver viewing a display monitor that receives a video feed from the camera assembly 26, for example.

FIG. 9 depicts an exemplary view 100 from a stop-arm with camera system 21 used in accordance with embodiments of the present technology. Various embodiments provide a camera assembly 26 that does not rely on mirrors 11-16 to create a captured image 100. Instead, the view 100 captured by the camera assembly 26 is sent to a display monitor that is positioned above the driver near the roof of the bus 1, for example. During a bus stop, a driver can look into the display monitor and see a clear, high-definition, view 100 of the right side 3 of the school bus 1. Not only can a driver see objects in the danger zone 7, but the quality of picture allows the driver to identify the identity of the objects. The camera assembly 26 is user friendly in that the driver merely needs to view a display monitor to see the view 100 captured by the camera assembly 26. The camera assembly 26 provides a wide view 100 for expansive coverage of school bus blind spots. For example, in various embodiments, the camera assembly 26 may provide a field of view approximately 12-15 feet. The field of view provides a view of the "danger zone" 7 on the right side 3 of the bus 1, for example.

Figure 10:
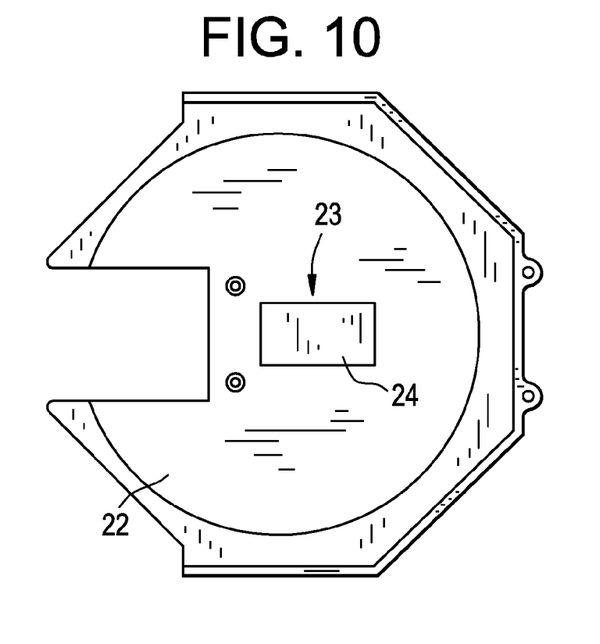
FIG. 10 depicts a front plan view of an exemplary stop-arm system shield with a recessed camera shield box used in accordance with embodiments of the present technology.
Figure 11:
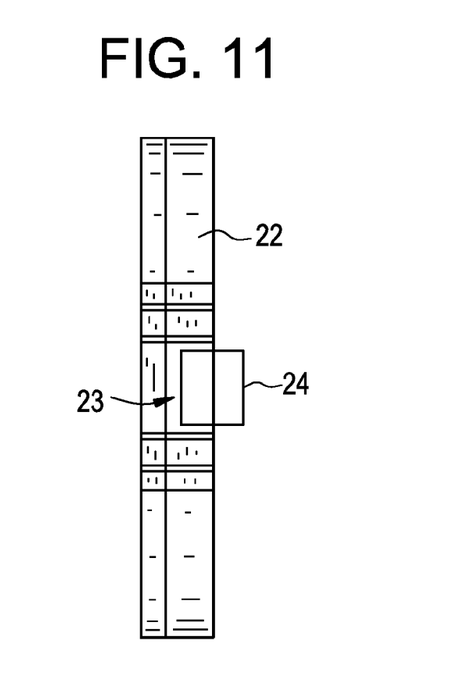
FIG. 11 depicts a side elevation view of an exemplary stop-arm system shield with a recessed camera shield box used in accordance with embodiments of the present technology.

FIG. 10 depicts a front plan view of an exemplary stop-arm system shield 22 with a recessed camera shield box 24 used in accordance with embodiments of the present technology. FIG. 11 depicts a side elevation view of an exemplary stop-arm system shield 22 with a recessed camera shield box 24 used in accordance with embodiments of the present technology. Referring to FIGS. 10-11, a shield 22 comprises a recess 23 cut into the shield 22 to hold a camera shield box 24 at least partially within the shield 22. The camera shield box 24 allows secure reception of a camera assembly 26 so that the camera assembly 26 remains clean and protected when not in use. In various embodiments, the camera shield box 24 comprises drip holes to allow moisture and/or debris to flow out of the box 24, thereby helping to keep the camera shield box 24 clean and dry. The shield 22 reduces the need for maintenance and cleaning of a camera assembly 26 due to exposure to dirt, elements, road grime, and debris, for example. In various embodiments, the shield 22 at least partially houses a stop-arm 29 when the stop-arm with camera system 21 is in a closed position, as illustrated in FIG. 4, for example.

Figure 12:
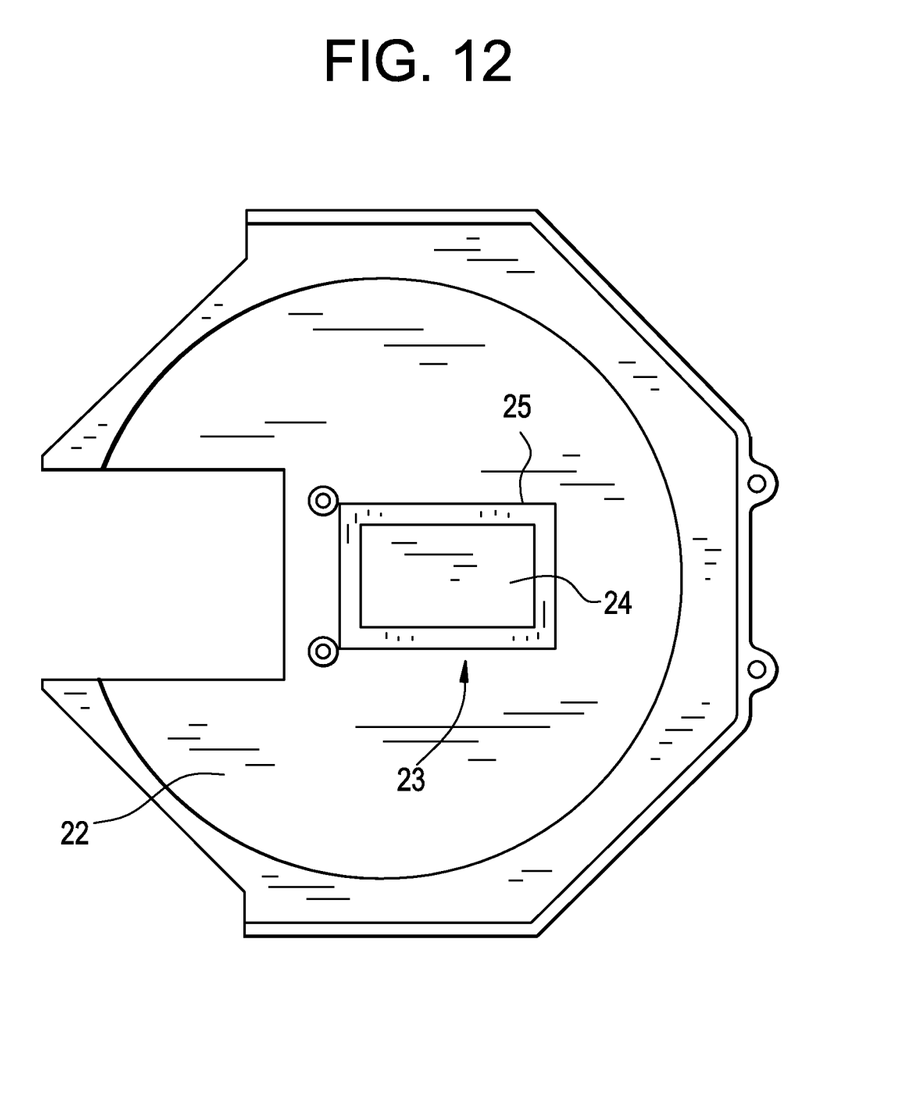
FIG. 12 depicts a front plan view of an exemplary stop-arm system shield with a recessed camera shield box and a camera shock absorber used in accordance with embodiments of the present technology.

FIG. 12 depicts a front plan view of an exemplary stop-arm system shield 22 with a recessed camera shield box 24 and a camera shock absorber 25 used in accordance with embodiments of the present technology. Referring to FIG. 12, a shield 22 comprises a recess 23 cut into the shield 22 to hold a camera shield box 24 at least partially within the shield 22. The camera shield box 24 allows secure reception of a camera assembly 26 so that the camera assembly 26 remains clean and protected when not in use. In various embodiments, a camera shock absorber may be included between the recess 23 and the camera shield box 34 to provide protection to a camera assembly 26 secured within the camera shield box 24 a force is applied to the shield 22 or stop-arm 29 of the stop-arm with camera system 21. For example, if the stop-arm with camera system 21 is contacted by tree branches, among other things, the camera shock absorber 25 may absorb the force from the impact so the camera assembly 26 is not jarred within the camera shield box 24. In various embodiments, the camera shock absorber 25 can be soft foam, springs, or any suitable mechanism for absorbing an outside force.

Figure 13:
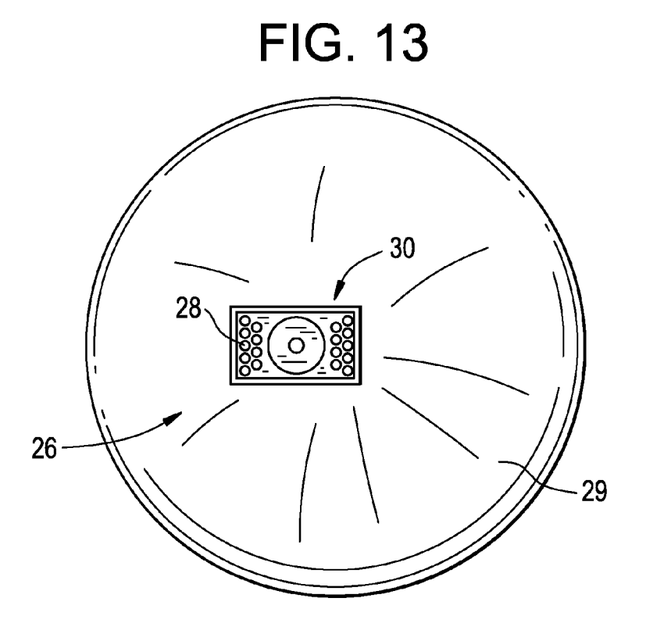
FIG. 13 depicts a front plan view of an exemplary camera assembly mounted to a stop-arm of a stop-arm with camera system used in accordance with embodiments of the present technology.
Figure 14:
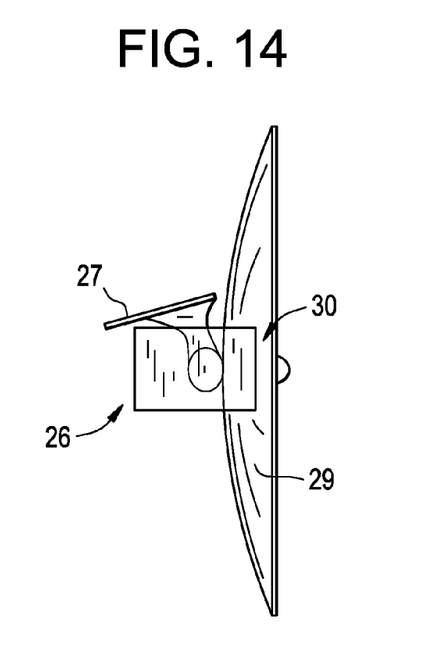
FIG. 14 depicts a side elevation view of an exemplary camera assembly mounted to a stop-arm of a stop-arm with camera system used in accordance with embodiments of the present technology.

FIG. 13 depicts a front plan view of an exemplary camera assembly 26 mounted to a stop-arm 29 of a stop-arm with camera system 21 used in accordance with embodiments of the present technology. FIG. 14 depicts a side elevation view of an exemplary camera assembly 26 mounted to a stop-arm 29 of a stop-arm with camera system 21 used in accordance with embodiments of the present technology. Referring to FIGS. 13-14, the stop-arm 29 may comprise a camera assembly 26, such as an optical lens, mounted to a first side of the stop-arm 29. The camera assembly 26 provides a wide view for expansive coverage of school bus blind spots. In various embodiments, the stop-arm 29 comprises a recess 30 for receiving and securing the camera assembly 26 at least partially within the stop-arm 29. The optical lens of the camera assembly 26 may be configured to aim down a right side of a vehicle 1 to offer a view of the danger zone 7, as illustrated in FIG. 9, for example, when the stop-arm 29 is deployed in an open position, as illustrated in FIGS. 5-7, for example. In a representative embodiment, the camera assembly 26 comprises lights 28 and/or night vision to provide views of the danger zone 7 at night. In certain embodiments, the camera assembly 26 comprises a visor 27 that minimizes sun glare during sunrise and sunset, for example.

In operation, when a driver turns on a master switch to open a bus door, for example, a stop-arm 29 deploys and a camera assembly 26 activates. While the stop-arm 29 is deployed and the camera assembly 26 activated, a lens of the camera assembly 26 captures a wide view 100 of the right side 3 of the bus 1 that includes the danger zone 7 and provides the images and/or video to a display monitor that is positioned above the driver near the roof of the bus 1, for example. In various embodiments, the view 100 may be a video feed, among other things, provided from the camera assembly 26 of the stop-arm with camera system 21 communicated to the display monitor inside the vehicle 1 via wired or wireless transmission, for example. As such, a driver can look into the display monitor and see a clear, high-definition, view 100 of the right side 3 of the school bus 1. Not only can a driver see objects in the danger zone 7, but the quality of picture allows the driver to identify the identity of the objects. The stop-arm 29 remains deployed and the camera assembly 26 activated until the driver shuts the door. After the door is shut, the stop-arm 29, as well as any additional stop-arms, closes and becomes ready for the bus 1 to commute down the road.

In summary, the stop-arm with camera system 21 maximizes clarity and vision within the danger zone 7, deters traffic from passing on the right, and remains protected when not in use. The stop-arm with camera system 21 allows for a clear, unobstructed, and extensive view of the danger zone 7 of the right side 3 of school buses 1, thus minimizing fatalities and injuries within the blind spots and danger zone 7 of school buses 1. The stop-arm with camera system 21 offers a user friendly method of viewing the danger zone 7, thus minimizing driver error and maximizing safety for boarding and discharging passengers within the danger zone 7.

Figure 15:
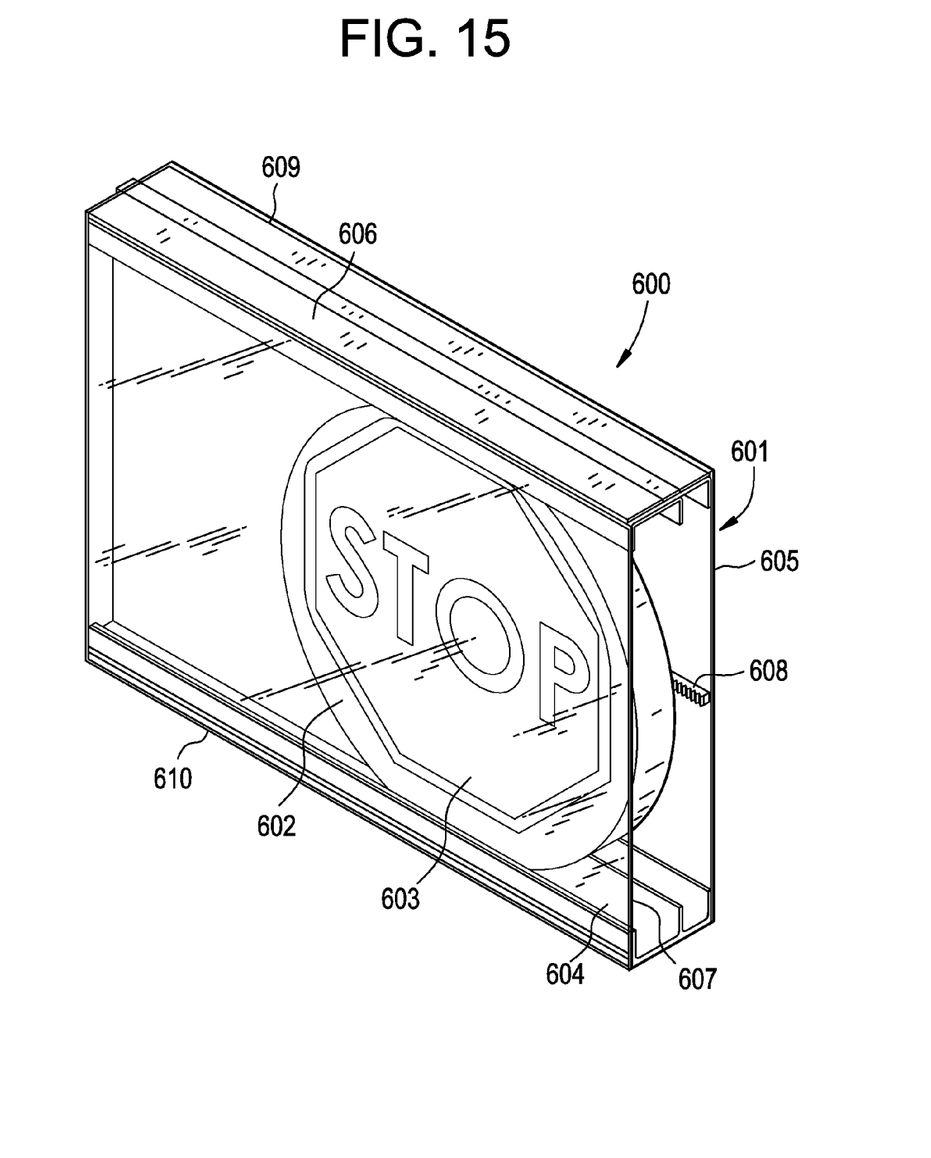
FIG. 15 depicts a front perspective view of an exemplary deployable stop sign with camera system used in accordance with embodiments of the present technology.

FIG. 15 depicts a front perspective view of an exemplary deployable stop sign with camera system 600 used in accordance with embodiments of the present technology. Referring to FIG. 15, the system 600 includes a housing 601 and a deployable sign 602. The sign 602 includes a stop sign 603 on one side and a camera assembly 702 (depicted in FIGS. 16 and 18) on the opposite side. The housing 601 includes walls 605, 607, 609, 610. Disposed within the housing are guides 604, 606 and deployment mechanism 608. The sign 602 is configured to be deployable such that sign 602 translates about guides 604, 606 using deployment mechanism 608. When the sign 602 is in a fully deployed position, stop sign 603 and camera assembly 702 are completely out of housing 601. When the sign 602 is in a fully recessed position, stop sign 603 and camera assembly 702 are completely within housing 601. In certain embodiments, deployment mechanism 608 comprises a rack and pinion operably connected to a control system comprising circuitry and software. The control system can be used to control deployment of the sign 602 using deployment mechanism 608.

Figure 16:
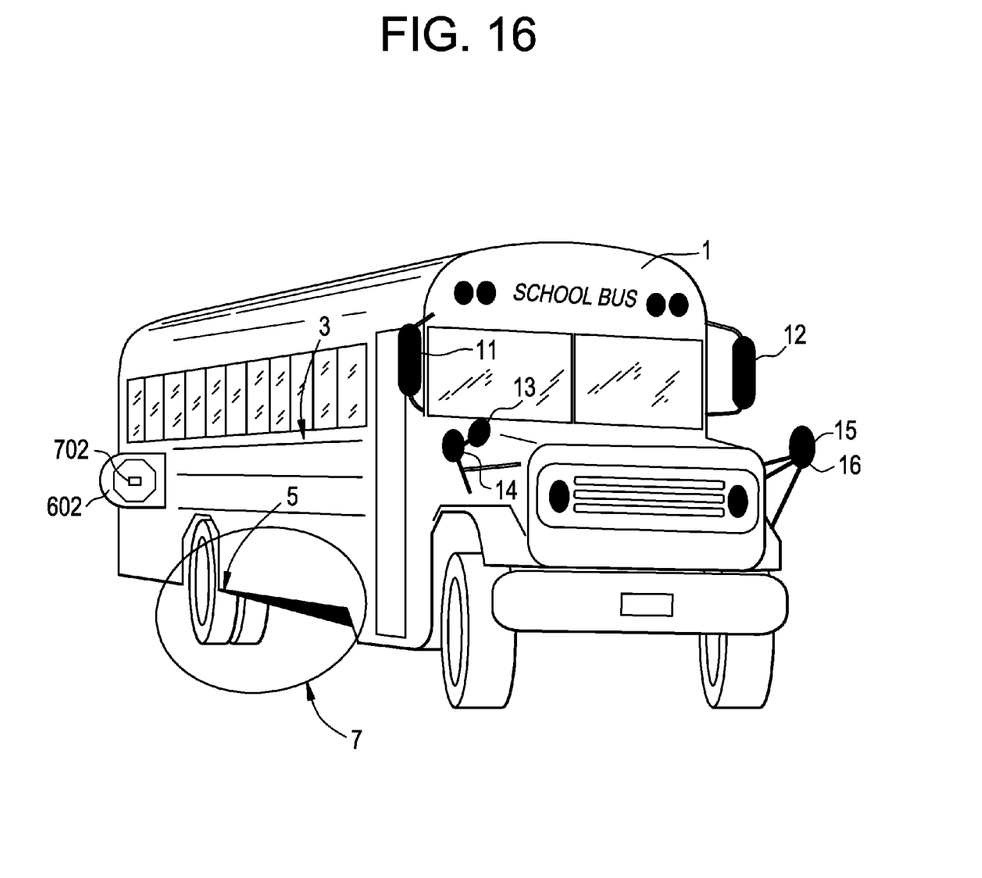
FIG. 16 depicts a front, right perspective view of a bus with an exemplary stop sign with camera system mounted toward a rear end of a passenger side of a bus, the stop sign system in a fully deployed position in accordance with embodiments of the present technology.
Figure 17:
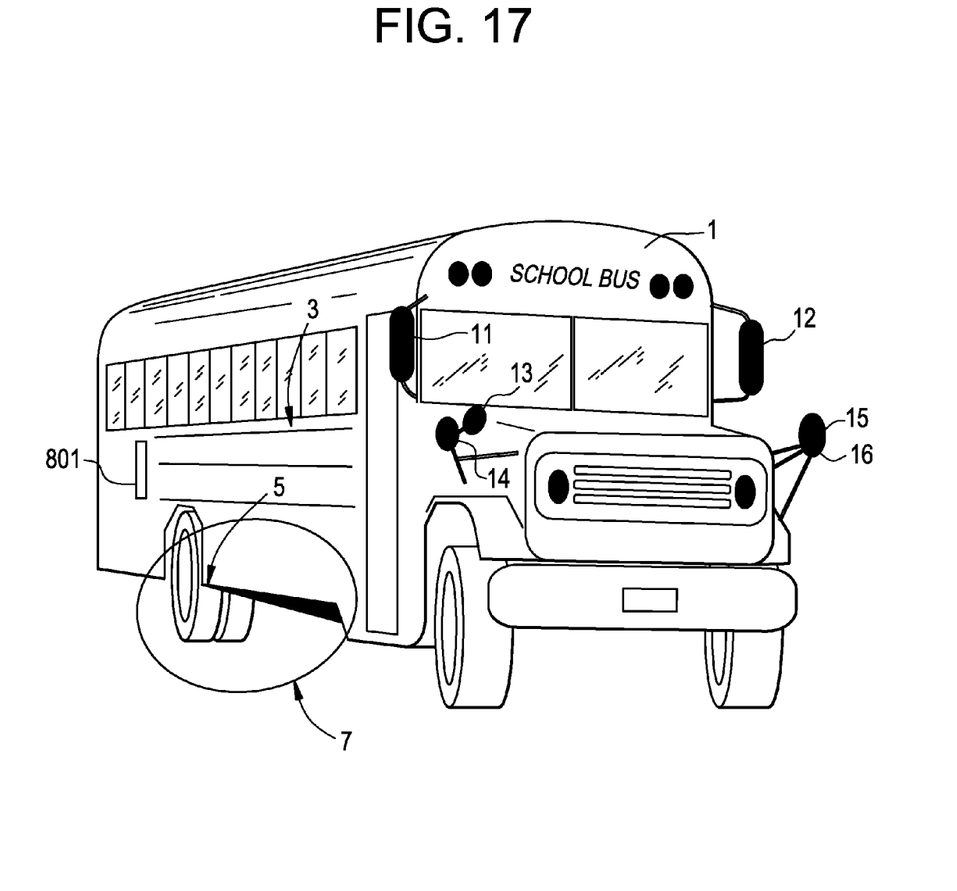
FIG. 17 depicts a front, right perspective view of the bus with the exemplary stop sign with camera system of FIG. 16 in a fully recessed position in accordance with embodiments of the present technology.

FIG. 16 depicts a front, right perspective view of a bus with an exemplary stop sign with camera system 600 mounted toward a rear end of a passenger side 3 of a bus 1, the stop sign with camera system 600 in a fully deployed position in accordance with embodiments of the present technology. FIG. 17 depicts a front, right perspective view of the bus 1 with the exemplary stop sign with camera system 600 of FIG. 16 in a fully recessed position in accordance with embodiments of the present technology. Referring to FIGS. 16-17, the deployable stop sign with camera system 600 can be mounted toward a rear end of a passenger side of a bus 1 such that the housing 601 is disposed within the bus 1. FIG. 16 depicts sign 602 in a fully deployed position where camera assembly 702 faces toward the front of the bus 1, and stop sign 603 faces toward the rear of the bus 1. In the fully deployed position, sign 602 is substantially perpendicular to the side 3 of the bus 1. The camera assembly 702 can provide a view 100 of danger area 7 (for example, under the vehicle 1 and between a rear wheel 5 of the vehicle 1 and a front wheel of the vehicle 1) on the right side 3 of the bus 1 to a driver via a display monitor inside the bus 1. In the fully recessed position depicted in FIG. 17, sign 602 is disposed in the housing 601 inside the bus 1. FIG. 17 depicts opening 801 through which sign 602 can be deployed.

Figure 18:
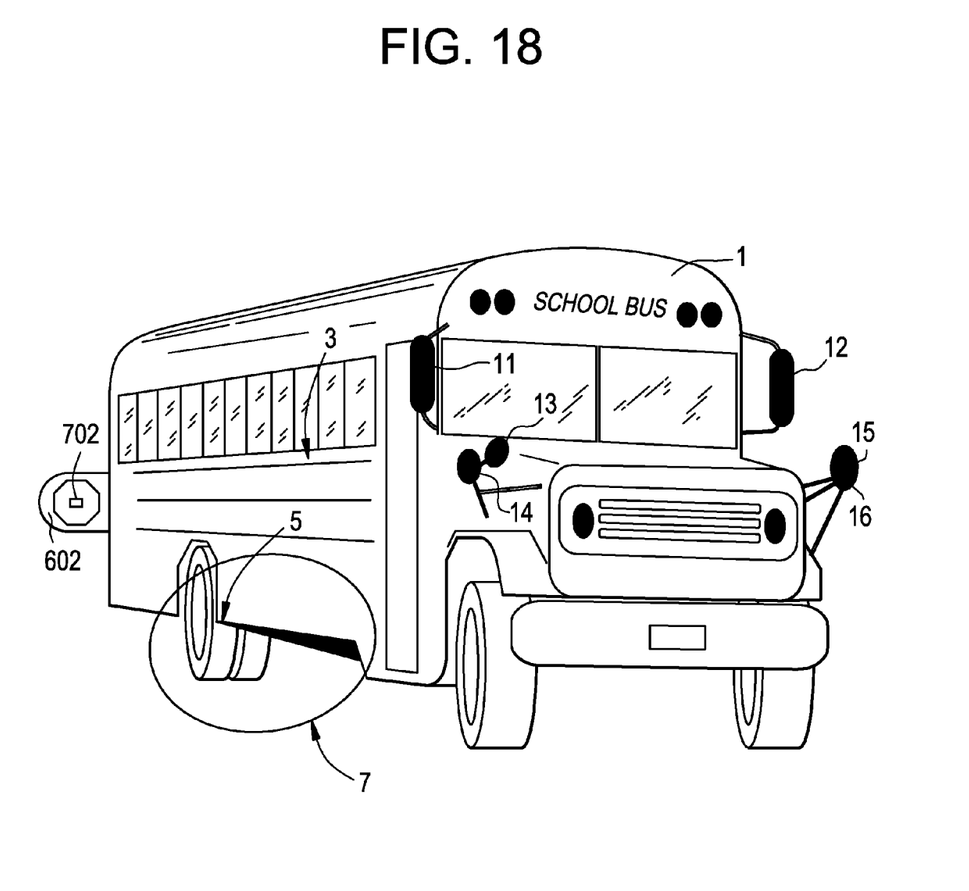
FIG. 18 depicts a front, right perspective view of a bus with an exemplary stop sign with camera system mounted toward a rear end of a passenger side of a bus, the stop sign system in a fully deployed position in accordance with embodiments of the present technology.
Figure 19:
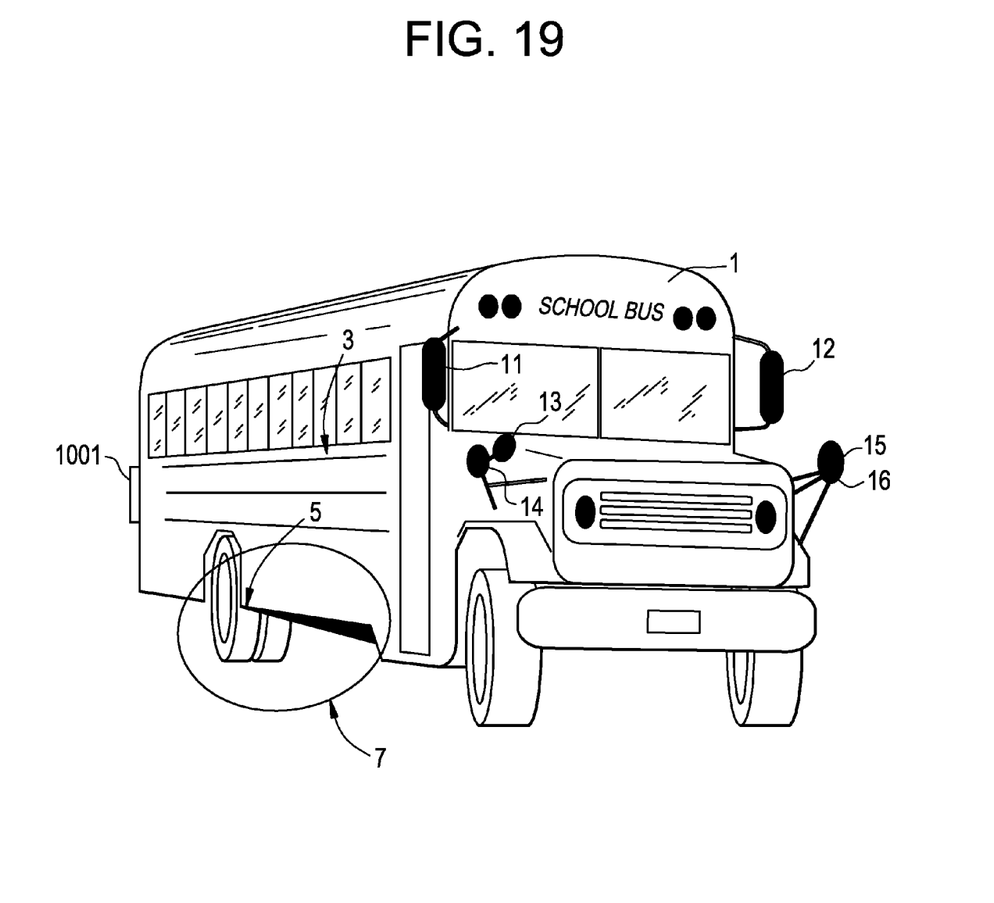
FIG. 19 depicts a front, right perspective view of the bus with the exemplary stop sign with camera system of FIG. 18 in a fully recessed position in accordance with embodiments of the present technology.

FIG. 18 depicts a front, right perspective view of a bus 1 with an exemplary stop sign with camera system 600 mounted toward a rear end of a passenger side 3 of a bus, the stop sign system in a fully deployed position in accordance with embodiments of the present technology. FIG. 19 depicts a front, right perspective view of the bus 1 with the exemplary stop sign with camera system 600 of FIG. 18 in a fully recessed position in accordance with embodiments of the present technology. Referring to FIGS. 18-19, the deployable stop sign with camera system 600 can be mounted toward a rear end of a passenger side 3 of a bus 1 such that the housing 601 is disposed behind the bus 1. FIG. 18 depicts sign 602 in a fully deployed position where camera assembly 702 faces toward the front of the bus 1, and stop sign 603 faces toward the rear of the bus 1. In the fully deployed position, sign 602 is substantially perpendicular to the side 3 of the bus 1 and parallel to the rear of the bus 1. The camera assembly 702 can provide a view of the danger area 7 (for example, under the vehicle 1 and between a rear wheel 5 of the vehicle 1 and a front wheel of the vehicle 1) on the right side 3 of the bus 1 to the driver via a display monitor inside the bus 1. In the fully recessed position depicted in FIG. 19, sign 602 is disposed in the housing 601 behind the bus 1. FIG. 19 depicts opening 1001 through which sign 602 can be deployed.

In various embodiments, the camera assembly 702 described in reference to FIGS. 15-19 shares various characteristics with the camera assembly 26 described in reference to FIGS. 6-7, 9, and 13-14, for example.

In operation, the deployable stop sign with camera system 600 can be installed inside the right side (passenger side) 3 of a vehicle 1 toward the rear of the vehicle 1, including behind the vehicle 1. Sign 602 can be deployed from a fully recessed position (where the stop sign 603 and camera assembly 702 are disposed within the housing 601) to a fully deployed position (where the stop sign 603 and camera assembly 702 are completely outside the housing 601) using deployment mechanism 608 and guides 604, 606. In the fully deployed position, sign 602 can be substantially perpendicular to the side 3 of the vehicle 1. The camera assembly 702 can provide a view 100 of the danger area 7 (for example, under the vehicle 1 and between a rear wheel 5 of the vehicle 1 and a front wheel of the vehicle 1) on the right side 3 of the vehicle 1 to the driver via a display monitor inside the bus 1. In various embodiments, the view 100 may be a video feed, among other things, provided from the camera assembly 702 of the deployable stop sign with camera system 600 communicated to the display monitor inside the vehicle 1 via wired or wireless transmission, for example.

Aspects of the present invention provide a stop-arm with camera system 21 for a vehicle 1. The stop-arm with camera system 21 comprises a shield 22, a stop-arm 29, and a camera assembly 26. The stop-arm 29 comprises a first side and a second side. The stop-arm 29 is deployable between a first position where the first side of the stop-arm 29 is disposed at least partially inside the shield 22, and a second position where the stop-arm 29 is substantially perpendicular to the shield 22. The camera assembly 26 is coupled to the first side of the stop-arm 29.

In certain embodiments, the shield 22 comprises a camera recess 23. In various embodiments, the shield 22 comprises a camera shield box 24 at least partially disposed within the camera recess 23. In a representative embodiment, the camera shield box 24 comprises drip holes. In certain embodiments, the camera assembly 26 is at least partially disposed in the camera shield box 24 when the stop-arm 29 is in the first position. In various embodiments, the shield 22 comprises a shock absorber 25 disposed between the camera recess 23 and the camera shield box 24. In a representative embodiment, the shock absorber 25 is foam.

In various embodiments, the stop-arm with camera system 21 comprises a motor 33 operable to deploy the stop-arm 29 between the first position and the second position. In certain embodiments, the stop-arm 29 comprises a stop sign 31 coupled to the second side. In a representative embodiment, the stop sign 31 comprises lights 32. In various embodiments, the camera assembly 26 comprises a visor 27. In certain embodiments, the camera assembly 26 comprises lights 28 to illuminate a viewing area 100. In various embodiments, the camera assembly 26 comprises night vision.

In a representative embodiment, the stop-arm with camera system 21 comprises a display monitor mounted inside a bus 1 and operable to display image data 100 captured by the camera assembly 26. In certain embodiments, the image data is a video feed 100 communicated to the display monitor from the camera assembly 26. In various embodiments, the image data 100 is communicated from the camera assembly 26 to the display monitor via a wireless connection. In a representative embodiment, the stop-arm with camera system 21 comprises a switch operable to deploy the stop-arm 29 and activate the camera assembly 26.

In certain embodiments, the stop-arm 29 comprises a stop-arm recess 30 at the first side of the stop-arm 29. The camera assembly 26 is at least partially disposed within the stop-arm recess 30. In various embodiments, the camera assembly 26 provides a view 100 including an area that is under the vehicle 1 and between a rear wheel 5 of the vehicle and a front wheel of the vehicle 1 when the stop-arm 29 is in the second position. In a representative embodiment, the system 21 is mounted on a rear passenger side 3 of the vehicle 1. In certain embodiments, the vehicle 1 is a bus.

Various embodiments provide a deployable stop sign with camera system 600. The deployable stop sign with camera system 600 comprises a sign 602 and a camera assembly 702. The sign 602 comprises a first side facing a front of the vehicle 1 and a second side facing a rear of the vehicle 1. The sign 602 is deployable between a first position where the sign 602 is disposed inside or behind the vehicle 1, and a second position where the sign 602 is extended beyond a side 3 of the vehicle 1 and is substantially perpendicular to the side 3 of the vehicle 1. The camera assembly 702 is coupled to the first side of the sign 602. The camera assembly 702 provides a view 100 of an area that is under the vehicle 1 and between a rear wheel 5 of the vehicle 1 and a front wheel of the vehicle 1 when the sign 602 is in the second position.

Although devices and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. A stop-arm with camera system for a vehicle, the system comprising:
   a shield fixably mountable to a side of the vehicle;
   a stop-arm comprising a first side and a second side, the stop-arm deployable relative to the fixably mountable shield between a first position wherein the first side of the stop-arm is disposed at least partially inside the shield, and a second position wherein the stop-arm is substantially perpendicular to the shield; and
   a camera assembly coupled to and extending away from the stop-arm at the first side of the stop-arm.

2. The system according to claim 1, wherein the shield comprises a front flat surface having a camera recess.

3. The system according to claim 2, wherein the shield comprises a camera shield box at least partially disposed within the camera recess.

4. The system according to claim 3, wherein the camera shield box comprises drip holes.

5. The system according to claim 3, wherein the camera assembly is at least partially disposed in the camera shield box when the stop-arm is in the first position.

6. The system according to claim 3, wherein the shield comprises a shock absorber disposed between the camera recess and the camera shield box.

7. The system according to claim 6, wherein the shock absorber is foam.

8. The system according to claim 1, comprising a motor operable to deploy the stop-arm between the first position and the second position.

9. The system according to claim 1, wherein the stop-arm comprises a stop sign coupled to the second side.

10. The system according to claim 9, wherein the stop sign comprises lights.

11. The system according to claim 1, wherein the camera assembly comprises a visor.

12. The system according to claim 1, wherein the camera assembly comprises lights to illuminate a viewing area.

13. The system according to claim 1, wherein the camera assembly comprises night vision.

14. The system according to claim 1, comprising a display monitor mounted inside the vehicle and operable to display image data captured by the camera assembly.

15. The system according to claim 14, wherein the image data is a video feed communicated to the display monitor from the camera assembly.

16. The system according to claim 14, wherein the image data is communicated from the camera assembly to the display monitor via a wireless connection.

17. The system according to claim 1, comprising a switch operable to deploy the stop-arm and activate the camera assembly.

18. The system according to claim 1, wherein the stop-arm comprises a stop-arm recess at the first side of the stop-arm, and wherein the camera assembly is at least partially disposed within the stop-arm recess.

19. The system according to claim 1, wherein the camera assembly provides a view including an area that is under the vehicle and between a rear wheel of the vehicle and a front wheel of the vehicle when the stop-arm is in the second position.

20. The system according to claim 1, wherein the system is mounted on a rear passenger side of the vehicle.

21. The system according to claim 1, wherein the vehicle is a bus.

22. A deployable stop sign with camera system for a vehicle, the system comprising:
   a sign comprising a first side facing a front of the vehicle and a second side facing a rear of the vehicle, the sign deployable between a first position wherein the sign is disposed inside the vehicle or behind the rear of the vehicle, and a second position wherein the sign is extended beyond a side of the vehicle and is substantially perpendicular to the side of the vehicle; and
   a camera assembly coupled to the first side of the sign, wherein the camera assembly provides a view of an area that is under the vehicle and between a rear wheel of the vehicle and a front wheel of the vehicle and when the sign is in the second position.

* * * * *